Figure 1:
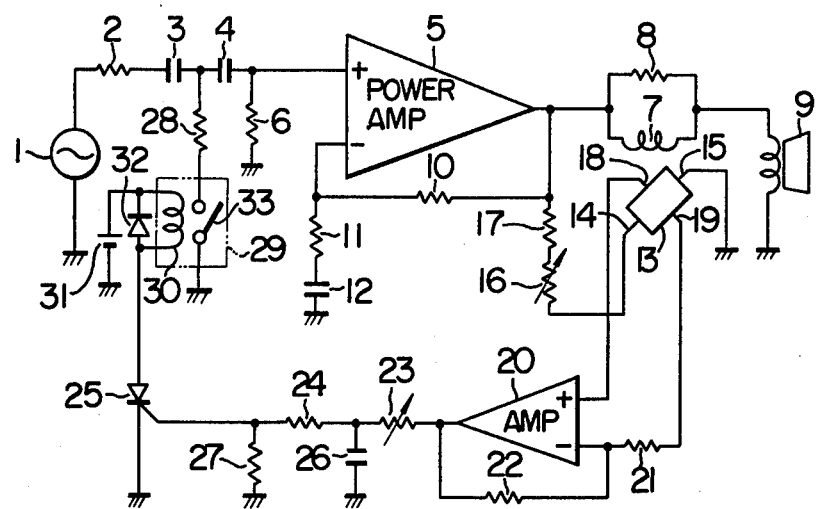

United States Patent [19]

Baba et al.

[11] 4,163,119

[45] Jul. 31, 1979

[54] PROTECTIVE CIRCUIT FOR ELECTROACOUSTIC TRANSDUCER WITH HALL ELEMENT AND VOICE COIL TEMPERATURE RISE TIME CONSTANT CIRCUIT

[75] Inventors: Tatsuo Baba, Toyokawa; Yoshito Ohmura, Aichi; Hiroshi Fukushima; Hideo Fukuma, both of Toyokawa, all of Japan

[73] Assignee: Hitachi, Ltd., Japan

[21] Appl. No.: 834,901

[22] Filed: Sep. 20, 1977

[30] Foreign Application Priority Data

Sep. 27, 1976 [JP] Japan .................. 51-114762

[51] Int. Cl.² .................................. H04R 3/00
[52] U.S. Cl. .................. 179/1 F; 179/1 A; 179/1 VL
[58] Field of Search .............. 179/1 F, 1 VL, 1 A; 330/7; 307/309; 323/20, 94 H

[56] References Cited

U.S. PATENT DOCUMENTS

| | | | |
|---|---|---|---|
| 3,284,726 | 11/1966 | Kotecki | 307/309 |
| 3,370,246 | 2/1968 | O'Brien | 230/6 |
| 3,373,330 | 3/1968 | O'Brien | 323/94 H |
| 3,388,318 | 6/1968 | O'Brien | 323/20 |
| 3,408,575 | 10/1968 | Petrocelli et al. | 179/1 F |
| 3,551,706 | 12/1970 | Chapman | 307/309 |
| 3,935,513 | 1/1976 | Suzuki | 323/20 |

FOREIGN PATENT DOCUMENTS 2319934 2/1977 France ................... 323/94 H

OTHER PUBLICATIONS

*The Right Angle*, Feb. 1964, vol. 11, No. 3, pp. 4 & 5, "Audio Frequency Power Measurements Using the Hall Effect", J. W. Sauber.
*National Technical Report*, (Japan) vol. 16, No. 3, Jun. 1970, pp. 377–389, "Temperature Rise of Loudspeaker Voice Coil and Design of Loudspeaker", N. Atoji et al.

*Primary Examiner*—George G. Stellar
*Attorney, Agent, or Firm*—Craig and Antonelli

[57] ABSTRACT

The output signal of an l-f (low-frequency) power amplifier is supplied to an electroacoustic transducer, through an inductive element for preventing parasitic oscillation, to cause the inductive element to generate a magnetic flux whose density depends on the output current signal of the power amplifier while a current according to the magnitude of the output voltage signal of the power amplifier is supplied to the current input terminals of a Hall-effect element disposed in the magnetic field induced by the inductive element, so that a voltage according to the output power of the l-f power amplifier is taken out of the output terminals of the Hall-effect element. When the voltage exceeds a predetermined level, the l-f signal supplied to the electroacoustic transducer is attenuated by a signal attenuating circuit so that the transducer is prevented from being damaged.

10 Claims, 2 Drawing Figures

PROTECTIVE CIRCUIT FOR ELECTROACOUSTIC TRANSDUCER WITH HALL ELEMENT AND VOICE COIL TEMPERATURE RISE TIME CONSTANT CIRCUIT

LIST OF PRIOR ART REFERENCES (37 CFR 1.56 (a))

The following references are cited to show the state of the art:
 (i) Japanese Pat. Appln. Laid-Open No. 9355/75 (Pioneer Electronic Corporation), laid-open Jan. 30, 1975
 (ii) Japanese Pat. Appln. Laid-Open No. 26454/75 (Mitaken Co., Ltd.), laid-open Mar. 19, 1975
 (iii) Japanese Pat. Appln. Laid-Open No. 60165/75 (Hitachi, Ltd.), laid-open May 23, 1975
 (iv) Japanese Pat. Appln. Laid-Open No. 60166/75 (Hitachi, Ltd.), laid-open May 23, 1975.

This invention relates to a protective circuit for an electroacoustic transducer for receiving a low-frequency signal and converting it to an acoustic signal, and more particularly to a protective circuit for preventing a loudspeaker from being damaged by an excessive input supplied thereto from an l-f power amplifier A loudspeaker for receiving the output of an l-f power amplifier and converting it into an acoustic signal has a rated impedance and an upper limit to its maximum allowable input. Currently used speakers are usually divided into two groups: one having a rated impedance of 4 ohms and the other having a rated impedance of 8 ohms, and they have allowable maximum inputs ranging from 30 to 100 W.

Recently, there have been increased l-f power amplifiers having high power outputs which amplify the outputs of disk record players, magnetic tape players etc., which are fed to loudspeakers. Accordingly, many power amplifiers are now able to deliver power outputs greater than the allowable maximum inputs of loudspeakers. Therefore, speakers are now frequently damaged by the supply of power greater than the allowable maximum input to the speaker.

It is therefore necessary for an l-f power amplifier which is capable of delivering a high output power to be so designed that its output power may be controlled so as not to exceed the allowable maximum input to the associated speaker. One of the conventional methods for limiting the output power of the l-f power amplifier is to use a voltage limiting circuit for limiting the voltage of the output signal of an l-f power amplifier by limiting the amplitude of the input signal to the l-f power amplifier in accordance with the allowable input to a loudspeaker. According to the voltage limiting circuit, a plurality of zener diodes having different zener breakdown voltages are connected in parallel via a change-over switch between the input terminal of the l-f power amplifier and ground. One of the zener diodes is selected by the change-over switch according to the allowable input of a speaker to be used so that when the voltage of the input signal exceeds the zener breakdown voltage of the selected diode, the diode turns conductive to limit the amplitude of the input signal. Also, the Japanese Patent Application Laid-Open No. 9355/75 (laid open on Jan. 30, 1975) discloses an "output limiting circuit." According to the Japanese application, series circuits each consisting of a diode and a dc power source are connected between the base of the output transistor of the l-f power amplifier and ground. The diodes are reversely biased by the voltage of the dc power sources. When the voltage of the input signal to the base of the output transistor exceeds any one voltage of the dc power sources, the associated diode turns conductive to limit the amplitude of the input signal. The signal level for limiting the amplitude can be arbitrarily changed by changing the voltages of the dc power sources.

However, such an output limiter has the following drawback. Namely, the output limiter limits only the voltage amplitude of the input signal to the l-f power amplifier. Therefore, if a further excessive signal is supplied to the output limiter, the waveform of the signal supplied to the l-f power amplifier becomes roughly rectangular even though its amplitude is clipped, so that the increase of the power supplied to the speaker is still considerable.

In general, a speaker is not damaged even if an input above the allowable input of the speaker is applied only for a very short time. Such an input as allowable only for a very short period is defined as the "allowable maximum input" of the speaker. The above described output limiter always clips the peaks of the l-f signal above the predetermined amplitude and therefore distorts the reproduced sound much more than necessary. This results in an unpleasant disturbance to listeners.

Moreover, the above-described conventional protective circuits detect the amplitudes of the input and output voltages of the l-f power amplifier, but they do not detect the output power of the l-f power amplifier. This reduces the degree of protection for the speakers because the power consumed by a speaker depends on not only the voltage applied to the speaker but also on the rated impedance of the speaker. Therefore protection is incomplete without detecting the power supplied to the speaker. When the same voltage is applied to two speakers having rated impedances of 4 and 8 ohms respectively, the power consumed by the 4-ohm speaker is twice that consumed by the 8-ohm speaker. Therefore, careless use would cause fatal damage to a loudspeaker.

It is therefore one object of this invention to provide a protective circuit free from the drawbacks of the conventional equivalent, which circuit detects the actual power supplied to the speaker and performs a protective action on the speaker when the detected power exceeds the allowable input of the speaker.

Another object of this invention is to provide a protective circuit for a loudspeaker, which performs a protective action only when power in excess of the allowable input of the speaker appears for a period of time longer than a predetermined period.

In the present invention, in order to attain the above-mentioned objects, the output signal of an l-f power amplifier is supplied to an electroacoustic transducer. Magnetic flux having a flux density corresponding to the output signal current of the l-f power amplifier is generated by supplying to an inductive element the signal current flowing through the electroacoustic transducer or a current proportional to this signal current. A Hall-effect element is so disposed as to be subjected to the magnetic field generated by the inductive element. Thus, a voltage output corresponding to the output power of the l-f power amplifier is obtained from voltage output terminals of the Hall-effect element by supplying to current input terminals of the Hall-effect element a current corresponding to the magnitude of the output signal voltage of the l-f power amplifier. A signal attenuator is provided which is operated and controlled by the obtained voltage output of the Hall-effect element, whereby the electroacoustic transducer is prevented from being damaged by rendering the output signal power of the l-f power amplifier supplied to the electroacoustic transducer lower than the allowable input power of the transducer when the output power of the l-f power amplifier exceeds the allowable input power of the transducer.

According to the present invention, there is provided a protective circuit for an electroacoustic transducer which receives the output of a low-frequency power amplifier and converts the received output to a corresponding acoustic signal, comprising: an inductive element through which a current corresponding to the current of the output of the l-f power amplifier is caused to flow for thereby generating magnetic flux; a Hall-effect element having a pair of current input terminals and a pair of voltage output terminals, so disposed as to be subjected to the magnetic field induced by the inductive element, for receiving at the pair of input terminals a current corresponding to the voltage of the output of the l-f power amplifier and delivering between the pair of output terminals a voltage output corresponding to the output power of the l-f power amplifier; and a signal attenuator for receiving the output voltage of the Hall-effect element and attenuating the signal level of the l-f signal supplied from the l-f power amplifier to the electroacoustic transducer when the output voltage exceeds a predetermined level.

Figure 2:
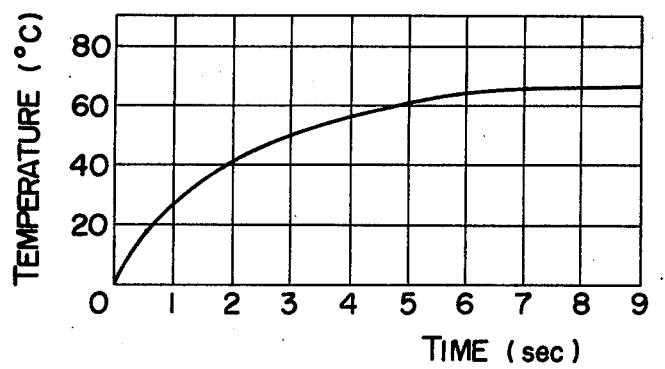

The invention will now be described, by way of example, with reference to the accompanying drawings, in which:

FIG. 1 shows a protective circuit for an electroacoustic transducer according to one embodiment of this invention; and FIG. 2 graphically shows the characteristic curve representing the temperature rise in the voice coil of the electroacoustic transducer.

In FIG. 1 showing a protective circuit for an electroacoustic transducer as an embodiment of this invention, an l-f signal source 1 has one of its two terminals grounded and the other output terminal connected through a series circuit of a resistor 2 and capacitors 3 and 4 with one of the two input terminals of an l-f power amplifier 5. The l-f power amplifier 5 is a well-known single-ended push-pull circuit including PNP and NPN transistors and the other input terminal thereof is grounded also through a resistor 6. The output terminal of the amplifier 5 is connected through a parallel circuit of an inductive element 7 and a resistor 8 with an electroacoustic transducer 9. The inductive element 7 is a coil for preventing parasitic oscillation in the amplifier 5 for a high frequency band and the electroacoustic tranducer 9 is a loudspeaker of a moving-coil type. The output terminal of the amplifier 5 is also connected through a resistor 10 with the other input terminal thereof, which is also grounded through a series circuit of a resistor 11 and a capacitor 12. In the vicinity of the inductive element 7 is disposed a Hall-effect element 13 which is magnetically coupled to the inductive element 7 by means of magnetic flux generated by the element 7. Of a pair of the current input terminals 14 and 15 of the Hall-effect element 13 the input terminal 14 is connected through a series circuit of a variable resistor 16 and a resistor 17 with the output terminal of the amplifier 5 while the other input terminal 15 is grounded. A pair of the voltage output terminals 18 and 19 are connected respectively with the input terminals of a voltage amplifier 20; one output terminal 18 being connected directly with one of the input terminals and the other output terminal 19 with the other input terminal through a resistor 21. The amplifier 20 is a voltage amplifier for amplifying the output voltage of the Hall-effect element 13, having a circuit configuration of a negative feedback amplifier with a resistor 22 connecting the output with the other input. The output terminal of the amplifier 20 is connected through a series circuit of a variable resistor 23 and a resistor 24 with the gate terminal a thyristor 25 functioning as a switching element. The junction point of the variable resistor 23 and the resistor 24 is grounded through a capacitor 26. The junction point of the capacitor 4 connected with the input terminal of the amplifier 5 and the capacitor 3 connected in series with the capacitor 4 is connected with one end of a resistor 28, the other end of which is connected with the stationary contact of a relay 29. The movable contact of the relay 29 is directly grounded. The coil 30 of the relay 29 has its one end connected with the anode of the thyristor 25 and the other end connected with the positive pole of a dc power source 31. The negative pole of the dc power source 31 is grounded and a diode 32 for protecting the relay 29 is connected across the coil 30. The cathode of the thyristor 25 is directly grounded.

With the circuit described above, an l-f signal from the l-f signal source 1 is supplied through the resistor 2 and the capacitors 3 and 4 to the l-f power amplifier 5, the amplified output of the amplifier 5 is sent to the electroacoustic transducer 9 to be reproduced as an acoustic signal. The output signal of the amplifier 5 is also supplied through the resistor 17 and the variable resistor 16 to the Hall-effect element 13. The Hall-effect element 13 is made of indium antimonide (InSb), indium arsenide (InAs) or germanium (Ge). Since the element 13 is placed so as to be subjected to magnetic flux B with a current I flowing through its current input terminals 14 and 15, a Hall voltage $V_H$ proportional to the product of the current I and the flux B is produced between its voltage output terminals 18 and 19. The relationship among the Hall voltage $V_H$, the current I and the magnetic flux B is given by the following expression.

$$H = \frac{R_H \cdot f_1}{t} \cdot I \cdot B \qquad (1),$$

where $R_H$ is the Hall coefficient, $f_1$ the coefficient depending on the shape of the Hall-effect element 13, and t the thickness of the element 13.

Since the input terminal 14 of the Hall-effect element 13 is connected through the resistors 16 and 17 with the output terminal of the amplifier 5, a current proportional to the voltage of the output signal of the amplifier 5 flows through the input terminals of the element 13. The l-f signal current supplied to the electroacoustic transducer 9 is also supplied to the inductive element 7, which in turn generates magnetic flux having a flux density proportional to the signal current of the l-f signal. Since the Hall-effect element 13 is disposed in the vicinity of the inductive element 7, it is interlinked with the magnetic flux generated by the inductive element 7. As a result, a Hall voltage $V_H$ proportional to the product of the output voltage and current of the amplifier 5, given by the above equation (1), is developed between the output terminals 18 and 19. The output signal of the amplifier 5 is an ac signal obtained by amplifying the l-f signal from the l-f signal source 1 and since the direction of the current flowing through the input terminals 14 and 15 of the Hall-effect element 13 and the direction of the magnetic flux generated by the inductive element 7 are simultaneously alternated each time the polarity of the ac signal alternates, the Hall voltage $V_H$ developed between the output terminals 18 and 19 of the element 13 becomes a dc voltage. In the illustrated case, the dc voltage is positive. The Hall voltage induced in the Hall-effect element 13 is proportional to the output power of the amplifier 5 to be supplied to the electroacoustic transducer 9 and the value of the Hall voltage is adjusted by the variable resistor 16. The variable resistor 16 controls the signal current flowing through the input terminals 14 and 15 of the Hall-effect element 13 and the Hall voltage $V_H$ in accordance with the allowable maximum input of the electroacoustic transducer 9 can be obtained through the adjustment of the variable resistor 16. The Hall voltage $V_H$ is applied to the voltage amplifier 20 and the amplified output of the amplifier 20 is supplied to a time constant circuit consisting of the variable resistor 23 and the capacitor 26. This time constant circuit has a time constant approximately equal to that of the temperature rise in the voice coil of the electroacoustic transducer 9 and the outer voltage of the time constant circuit is divided by the resistors 24 and 27. The divided voltage available at the junction point of the resistors 24 and 27 is applied to the gate terminal of the thyristor 25. When the voltage between the gate and cathode of the thyristor 25, i.e., the voltage according to the Hall voltage $V_H$, exceeds the firing voltage for the thyristor 25, the thyristor 25 turns conductive to cause a current to flow through the coil 30 of the relay 29 from the dc power source 31 so that the relay 29 operates to close the switch 33 for grounding the end of the resistor 28. The l-f signal from the l-f signal source 1 is divided by the resistors 2 and 28 so that the l-f signal to be supplied to the amplifier 5 is attenuated to decrease the output power of the amplifier 5.

Now, description will be made of how the Hall voltage $V_H$, i.e., the output voltage of the Hall-effect element, should be determined. The electroacoustic transducer 9 will be damaged if it is driven by an input greater than the allowable maximum input of the transducer 9, which could take place even though the input, i.e., the output of the l-f power amplifier 5, remained constant. Such a damage can be prevented by increasing the Hall voltage $V_H$. Namely, the output voltage of the Hall-effect element 13 is changed in accordance with the allowable maximum input of the electroacoustic transducer: when an electroacoustic transducer having a small allowable maximum input is used, the output voltage of the Hall-effect element 13 is increased by making the resistance value of the variable resistor 16 smaller while the output voltage of the Hall-effect element 13 is decreased for an electroacoustic transducer having a large allowable maximum input. The output voltage of the element 13 for an electroacoustic transducer having a rated impedance of 4 ohms should be higher than that for an electroacoustic transducer having a rated impedance of 8 ohms. The adjustment of the output voltage of the Hall-effect element 13 can be performed by changing the current flowing through the input terminals 14 and 15 of the element 13 through the control of the resistance value of the variable resistor 16. The output voltage of the Hall-effect element is so determined that the voltage applied to the gate terminal of the thyristor 25 is lower than the firing voltage for the thyristor 25 when the output power of the amplifier 5 is smaller than the allowable maximum input of the electroacoustic transducer 9 or that the voltage applied to the gate terminal of the thyristor 15 is higher than the firing voltage of the thyristor 25 when the output power of the amplifier 5 is greater than the allowable maximum input of the electroacoustic transducer 9. And in the former case, the thyristor 25 is cut off, the relay 29 is reset and the switch 33 is open, so that the l-f signal from the l-f signal source 1 is not attenuated while in the latter case the thyristor 25 turns conductive to attenuate the l-f signal.

The thyristor 25 serving as a switching element may be replaced by a bipolar transistor or a field-effect transistor. In that case, the output voltage of the time constant circuit is supplied to the base or the gate of the transistor and when the output voltage of the time constant circuit exceeds the base-emitter or the gate-source threshold voltage of the transistor, the transistor turns on to actuate the relay 29.

Among the causes of the electroacoustic transducer 9 being broken is thermal destruction. Such thermal destruction is caused since the insulating material for the voice coil or the voice coil bobbin is burnt by heat generated by the output power of the amplifier 5 supplied to the voice coil of the transducer 9.

FIG. 2 shows the characteristic curve representing the temperature rise in the voice coil of the electroacoustic transducer in the case where the voice coil is intermittently energized by the signal input. It takes about 7 seconds for the voice coil to reach a temperature of 65° C., as seen from FIG. 2, and the time constant in this case is about 2 seconds. If the time constant of the time constant circuit consisting of the resistor 23 and the capacitor 26 in FIG. 1 is so adjusted as to be in accordance with the time constant for the temperature rise in the voice coil of the electroacoustic transducer 9, the voltage applied to the gate of the thyristor 25 becomes a voltage proportional to the temperature of the voice coil so that when the temperature of the voice coil approaches a value at which the transducer 9 is burnt, the thyristor 25 is turned on to control the relay 29. Since the resistance value of the variable resistor 23 is variable, the time constant of the time constant circuit including the variable resistor 23 and the capacitor 26 can also be varied so that the protective circuit according to this invention can match numerous electroacoustic transducers having various different characteristics. With this protective circuit, the relay 29 is not actuated even if the output power of the amplifier 5 exceeds the allowable maximum input only for a short period of time, so that an excessive protective operation can be prevented.

As described above, according to the protective circuit for an electroacoustic transducer embodying this invention, the l-f signal is controlled by detecting the power supplied to the electroacoustic transducer so that even if the impedance of the transducer varies with the frequency of the input signal, the power supplied to the transducer can be exactly detected and therefore the transducer can be fully protected. Moreover, as means for attenuating the l-f signal power supplied to the electroacoustic transducer below the allowable maximum limit, a signal attenuator may be connected on the output side of the l-f power amplifier to attenuate the output signal of the l-f power amplifier. This device can be realized by connecting a pseudo-load having an impedance smaller than the rated impedance of the electroacoustic transducer in parallel with the transducer. Further, the current having a value according to the output voltage of the l-f power amplifier, available from the junction point of the inductive element and the electroacoustic transducer, may be supplied to the Hall-effect element. Also, the above-described inductive element may be replaced by an inductive element connected in parallel with the electroacoustic transducer and having an impedance higher than the rated impedance of the electroacoustic transducer. In that case, the power proportional to the signal power applied to the electroacoustic transducer is supplied to the inductive element and the magnetic flux generated by the inductive element is interlinked with the Hall-effect element.

What we claim is:

1. A protective circuit for an electroacoustic transducer which receives the output of a low-frequency power amplifier and converts the received output to a corresponding acoustic signal, comprising:
   an inductive element for receiving the output signal of said low-frequency power amplifier and generating magnetic flux corresponding to the current of said output signal of said power amplifier, said electroacoustic transducer receiving through said inductive element said output signal of said low-frequency power amplifier;
   a Hall-effect element having a pair of input terminals and a pair of output terminals, so disposed as to be subjected to the magnetic field induced by said inductive element;
   means for supplying said output signal of said low-frequency power amplifier to said pair of input terminals of said Hall-effect element;
   means for obtaining a Hall dc voltage corresponding to the power of said output signal of said low-frequency power amplifier from said pair of output terminals;
   a time constant circuit having a time constant in accordance with the time constant of temperature rise in the voice coil of said electroacoustic transducer, for receiving said Hall dc voltage and delivering an output obtained by varying said Hall dc voltage depending upon said time constant; and
   means for receiving the output voltage of said time constant circuit and shifting down the signal level of the low-frequency signal supplied to said electroacoustic transducer when said output voltage exceeds a predetermined level.

2. A protective circuit for an electroacoustic transducer as claimed in claim 1, wherein said inductive element is a coil for preventing the parasitic oscillation in said low-frequency power amplifier.

3. In a combination including a low-frequency power amplifier for receiving and amplifying a low-frequency signal and an electroacoustic transducer for receiving the output signal of said low-frequency power amplifier and converting it into an acoustic signal,
   a protective circuit for the electroacoustic transducer comprising:
   an inductive element for supplying the output signal current of said low-frequency power amplifier to said electroacoustic transducer and generating magnetic flux corresponding to said output signal current;
   a Hall-effect element having a pair of input terminals and a pair of output terminals, so disposed as to be subjected to the magnetic field induced by said inductive element;
   means for supplying to said pair of input terminals of said Hall-effect element a current corresponding to the magnitude of the output signal voltage of said low-frequency power amplifier;
   a voltage amplifier for receiving a Hall dc voltage from said pair of output terminals of said Hall-effect element and amplifying said Hall dc voltage;
   a time constant circuit for receiving the output voltage of said voltage amplifier and varying said output voltage depending on the time constant of the temperature rise in the voice coil of said electroacoustic transducer;
   a switching element for receiving the dc output voltage of said time constant circuit, said switching element being cut off when said dc output voltage is lower than a predetermined level and turned on when said dc output voltage exceeds said predetermined level; and
   a signal attenuator controlled by the output signal of said switching element, for attenuating said low-frequency signal applied to said low-frequency power amplifier when said switching element is turned on.

4. A protective circuit for an electroacoustic transducer as claimed in claim 3, wherein said time constant circuit is constituted by a resistor and a capacitor and the time constant of said time constant circuit is made variable.

5. A protective circuit for an electroacoustic transducer as claimed in claim 3, wherein said switching element is a thyristor and said output dc voltage of said time constant circuit is applied to the gate terminal of said thyristor.

6. A protective circuit for an electroacoustic transducer as claimed in claim 3, wherein said low-frequency power amplifier receives the low-frequency signal from a low-frequency signal source, and said signal attenuator comprises means for adding resistance between said low-frequency signal source and said low-frequency power amplifier when said switching element is turned on.

7. A protective circuit for an electroacoustic transducer having a voice coil which transducer receives the output of a low-frequency power amplifier and converts the received output to a corresponding acoustic signal, said amplifier having input and output terminals, the protective circuit comprising:
   an inductive element connected between the output terminal of said low-frequency power amplifier and said electroacoustic transducer to cause a low-frequency output current from said amplifier to flow in the inductive element to generate magnetic flux corresponding to said output current, said output current also flowing in said transducer;
   a Hall-effect element having a pair of current input terminals and a pair of voltage output terminals and disposed to be coupled with said magnetic flux generated by said inductive element, said Hall-effect element having said pair of input terminals fed with a current corresponding to a low-frequency output voltage from said amplifier to produce at said output terminals a dc voltage output corresponding to the output power of said amplifier;

a voltage amplifier having input and output terminals and fed at said input terminal with a dc voltage output from said Hall-effect element to amplify said dc voltage;

a switching element having a gate, an anode and a cathode;

a time constant circuit connected between the output terminal of said voltage amplifier and the gate of said switching element, the time constant of said time constant circuit being determined in accordance with the temperature rise characteristic of the voice coil of said transducer;

an attenuating circuit connected with either one of the anode and the cathode of said switching element, said attenuating circuit being non-operative when said switching element is non-conductive and being operative to attenuate an input signal to said power amplifier when said switching element is conductive; and means for adjusting said dc voltage output of said Hall-effect element so that the gate voltage of said switching element becomes equal to a firing voltage of said switching element when said output power of said power amplifier increases to the maximum allowable input level of said transducer and the so increased output power lasts at least for a predetermined time associated with the time constant of said time constant circuit.

8. A protective circuit for an electroacoustic transducer as claimed in claim 7, wherein said switching element is a thyristor.

9. A protective circuit for an electroacoustic transducer as claimed in claim 7, wherein said low-frequency power amplifier receives a low-frequency signal from a low-frequency signal source, and said signal attenuator comprises means for adding resistance between said low-frequency signal source and said low-frequency power amplifier when said switching element is turned on.

10. A protective circuit for an electroacoustic transducer as claimed in claim 7, wherein said means for adjusting said dc voltage output of said Hall-effect element comprises a variable resistor coupled between the output of said low-frequency power amplifier and one of the input terminals to the Hall-effect element.

* * * * *